(12) United States Patent
Sharma et al.

(10) Patent No.: US 9,124,615 B2
(45) Date of Patent: Sep. 1, 2015

(54) AUTHENTICATION OF CONTENT PROVIDER WEB SITES AND APPLICATIONS VIA A MOBILE DEVICE IDENTIFIER

(71) Applicant: Verizon Patent and Licensing Inc., Basking Ridge, NJ (US)

(72) Inventors: Manish Sharma, San Jose, CA (US); Kevin Flores, San Jose, CA (US); Devin Blong, Penngrove, CA (US); Tushar Chaudhary, Mountain View, CA (US); Annu Yadav, San Francisco, CA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 0 days.

(21) Appl. No.: 14/132,844

(22) Filed: Dec. 18, 2013

(65) Prior Publication Data

US 2015/0172297 A1   Jun. 18, 2015

(51) Int. Cl.
*G06F 21/00* (2013.01)
*H04L 29/06* (2006.01)

(52) U.S. Cl.
CPC .................................. *H04L 63/123* (2013.01)

(58) Field of Classification Search
USPC ......................................................... 726/2–10
See application file for complete search history.

(56) References Cited

U.S. PATENT DOCUMENTS

2008/0098464 A1 *  4/2008  Mizrah ............................ 726/5
2008/0289025 A1 * 11/2008  Schneider ...................... 726/10

* cited by examiner

*Primary Examiner* — Ghazal Shehni

(57) ABSTRACT

A device receives content that includes embedded authentication code, and provides the content for display. The device generates a request to authenticate the content based on execution of the embedded authentication code, and provides the request to a server device that authenticates the content based on the request. The device receives, from the server device, an indication indicating that the content is authenticated, when the content is authenticated. The indication includes a portion of an identifier associated with the device. The device provides the indication and the portion of the identifier associated with the device for display.

20 Claims, 10 Drawing Sheets

AUTHENTICATION OF CONTENT PROVIDER WEB SITES AND APPLICATIONS VIA A MOBILE DEVICE IDENTIFIER

BACKGROUND

A user may utilize a mobile device (e.g., a smart phone, a tablet computer, a laptop computer, etc.) to access and view content, such as, for example, a web site, an email message, a video, etc., provided by a content provider. The user may wish to access and utilize secure and authenticated content in certain scenarios. For example, if the user is making an online purchase, the user may want assurance that the user's payment information (e.g., credit card number, name, address, etc.) is being securely transmitted. In some situations, a service may be provided that authenticates the online purchase web site, and provides an indication that the web site is authenticated (e.g., via a secured seal, a trust seal, a data security seal, a business verified seal, a privacy seal, etc.). The indication may demonstrate, to the user, that the content provider is concerned with security and business identity.

DETAILED DESCRIPTION OF PREFERRED EMBODIMENTS

The following detailed description refers to the accompanying drawings. The same reference numbers in different drawings may identify the same or similar elements.

Figure 1:
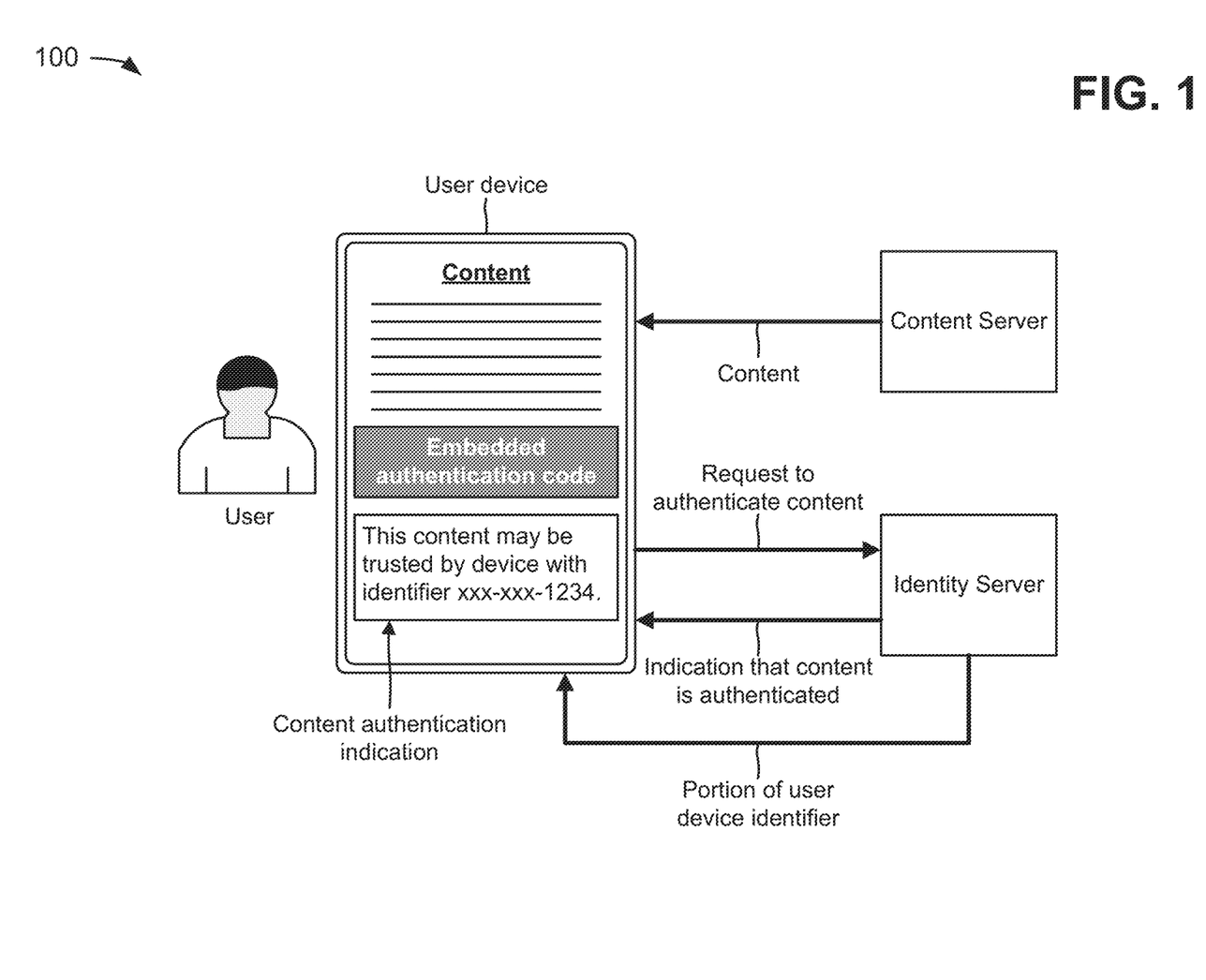
FIG. 1 is a diagram of an overview of an example implementation described herein.

FIG. 1 is a diagram of an overview of an example implementation 100 described herein. As shown in FIG. 1, assume that a user is associated with a user device that receives content (e.g., provided by a content provider) from a content server, and displays the content to the user. The content may include, for example, a web page for an online transaction, a link on a web site suggesting an offer to the user, an advertisement on a web page, a secure web site (e.g., a banking web site, an investment web site), etc. Further, assume that the user device includes a particular device identifier, such as "222-333-1234." As further shown in FIG. 1, the content may include embedded authentication code that may not be visible to the user. The embedded authentication code may cause the user device to generate a request to authenticate the content, before or after the content is displayed to the user.

The user device may provide the request to authenticate the content to an identity server, and the identity server may determine whether the content is authenticated or trusted. If the identity server determines that the content is not authenticated, the identity server may provide, to the user device, an indication that the content is not authenticated. The user device may display the indication that the content is not authenticated to the user, or may not display any indication. If the identity server determines that the content is authenticated, the identity server may provide, to the user device, an indication that the content is authenticated, as shown in FIG. 1. As further shown, the identity server may provide a portion of the user device identifier (e.g., "xxx-xxx-1234," where "x" may indicate a masked or hidden portion) to the user device. The user device may display, to the user, the indication that the content is authenticated along with the portion of the user device identifier. For example, the user device may display textual information, such as "This content may be trusted by device with identifier xxx-xxx-1234." By including the portion of the user device identifier in the textual information, the user may be assured that the content is authenticated and trusted.

The systems and/or methods described herein may enable a content provider to demonstrate, to a user of a user device, that content provided by the content provider is authenticated and secure. The systems and/or methods may assure the user that the content is authenticated based on an indication that includes an identifier that is unique to the user device, since it is highly unlikely for the content provider to know the identifier.

Content, as used herein, is to be broadly interpreted to include a web site, a web page, an application, a video, audio, an image, text, a software download, an advertisement, an email message, a link, and/or a combination of a web site, a web page, an application, a video, audio, an image, text, a software download, an advertisement, an email message, and/or a link.

Figure 2:
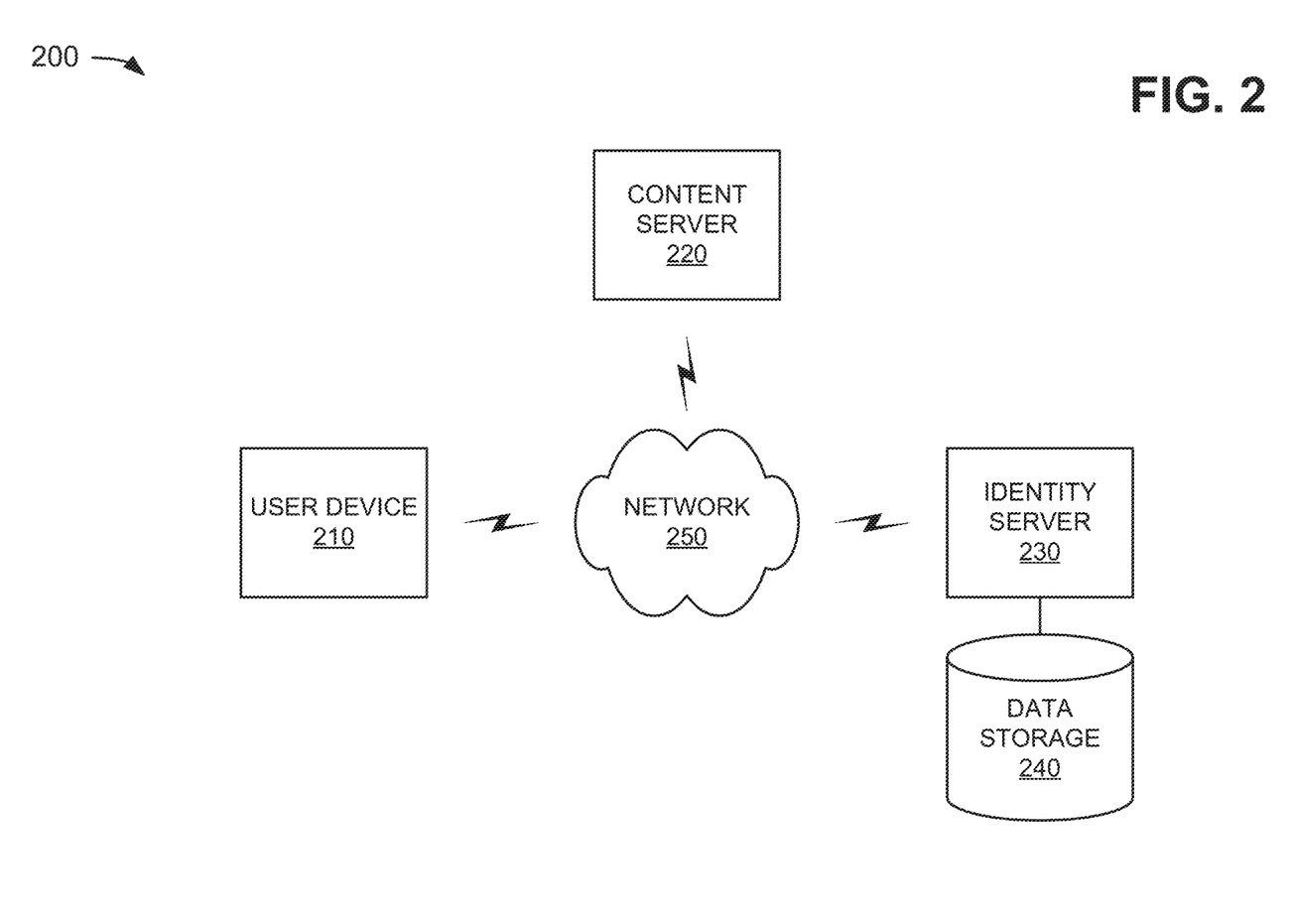
FIG. 2 is a diagram of an example environment in which systems and/or methods described herein may be implemented.

FIG. 2 is a diagram of an example environment 200 in which systems and/or methods described herein may be implemented. As illustrated, environment 200 may include a user device 210, a content server 220, an identity server 230, data storage 240, and a network 250. Devices/networks of environment 200 may interconnect via wired connections, wireless connections, or a combination of wired and wireless connections.

User device 210 may include a device that is capable of communicating over network 250 with content server 220, identity server 230, and/or data storage 240. In some implementations, user device 210 may include a radiotelephone; a personal communications services (PCS) terminal that may combine, for example, a cellular radiotelephone with data processing and data communications capabilities; a smart phone; a personal digital assistant (PDA) that can include a radiotelephone, a pager, Internet/intranet access, etc.; a laptop computer; a tablet computer; a desktop computer; a workstation computer; a personal computer; a landline telephone; a gaming device; or another type of computation and communication device.

Content server 220 may include one or more personal computers, workstation computers, server devices, or other types of computation and communication devices. In some implementations, content server 220 may provide content to user device 210 (e.g., via a web site and/or an application), and may provide embedded authentication code in the content. In some implementations, the embedded authentication code may cause user device 210 to generate a request to authenticate the content prior to or after displaying the content to a user of user device 210. The embedded authentication code may also cause user device 210 to provide the request to authenticate the content to identity server 230.

Identity server 230 may include one or more personal computers, workstation computers, server devices, or other types of computation and communication devices. In some implementations, identity server 230 may be associated with a communication provider (e.g., an Internet service provider, a telecommunications service provider, a television service provider, etc.) of the user of user device 210. In some implementations, identity server 230 may provide software code (e.g., the embedded authentication code) to content server 220. In some implementations, identity server 230 may receive the request to authenticate the content from user device 210, based on execution of the embedded authentication code by user device 210. In some implementations, identity server 230 may determine whether the content is authenticated based on the request. If identity server 230 determines that the content is authenticated, identity server 230 may provide, to user device 210, an indication that the content is authenticated, along with an identifier (e.g., a mobile directory number (MDN), a mobile equipment identifier (MEID), a telephone number, an Internet protocol (IP) address, etc.) associated with user device 210 or a portion of the identifier. If identity server 230 determines that the content is not authenticated, identity server 230 may provide, to user device 210, an indication that the content is not authenticated.

Data storage 240 may include one or more storage devices that store information in one or more data structures, such as databases, tables, lists, trees, etc. In some implementations, data storage 240 may store information, such as identifiers of user devices 210, information associated with content determined to be authenticated by identity server 230 (e.g., as being provided by a trusted content provider), etc. In some implementations, data storage 240 may be included within identity server 230.

Network 250 may include a network, such as a local area network (LAN), a wide area network (WAN), a metropolitan area network (MAN), a telephone network, such as the Public Switched Telephone Network (PSTN) or a cellular network, an intranet, the Internet, a fiber optic network, or a combination of networks.

The number of devices and/or networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
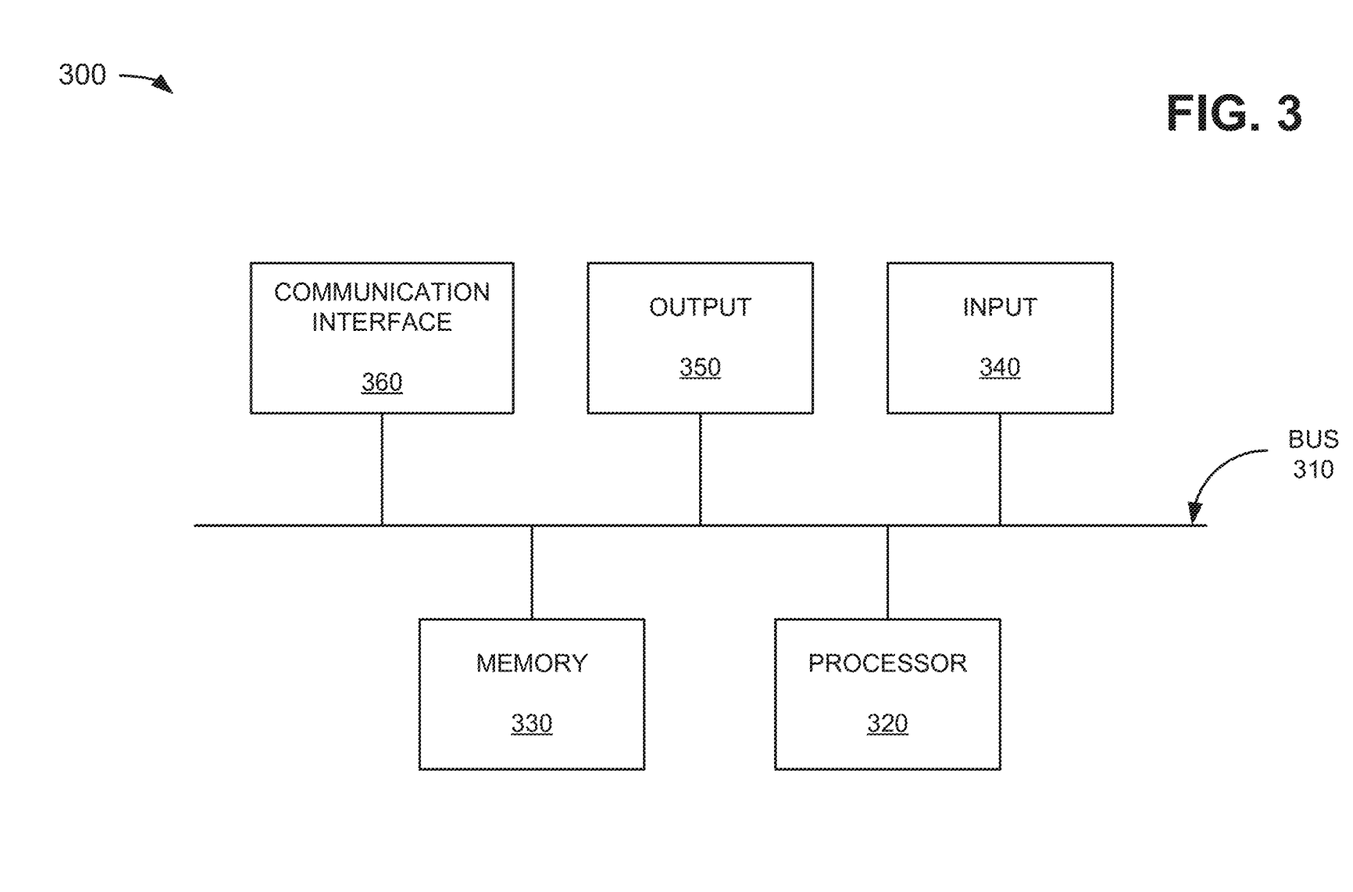
FIG. 3 is a diagram of example components of a device that may correspond to one or more of the devices of the environment depicted in FIG. 2.

FIG. 3 is a diagram of example components of a device 300 that may correspond to one or more of the devices of environment 200. In some implementations, one or more of the devices of environment 200 may include one or more devices 300 or one or more components of device 300. As shown in FIG. 3, device 300 may include a bus 310, a processor 320, a memory 330, an input component 340, an output component 350, and a communication interface 360.

Bus 310 may include a path that permits communication among the components of device 300. Processor 320 may include a processor (e.g., a central processing unit, a graphics processing unit, an accelerated processing unit, etc.), a microprocessor, and/or any processing component (e.g., a field-programmable gate array (FPGA), an application-specific integrated circuit (ASIC), etc.) that interprets and/or executes instructions, and/or that is designed to implement a particular function. In some implementations, processor 320 may include multiple processor cores for parallel computing. Memory 330 may include a random access memory (RAM), a read only memory (ROM), and/or another type of dynamic or static storage component (e.g., a flash, magnetic, or optical memory) that stores information and/or instructions for use by processor 320.

Input component 340 may include a component that permits a user to input information to device 300 (e.g., a touch screen display, a keyboard, a keypad, a mouse, a button, a switch, etc.). Output component 350 may include a component that outputs information from device 300 (e.g., a display, a speaker, one or more light-emitting diodes (LEDs), etc.).

Communication interface 360 may include a transceiver-like component, such as a transceiver and/or a separate receiver and transmitter, which enables device 300 to communicate with other devices, such as via a wired connection, a wireless connection, or a combination of wired and wireless connections. For example, communication interface 360 may include an Ethernet interface, an optical interface, a coaxial interface, an infrared interface, a radio frequency (RF) interface, a universal serial bus (USB) interface, a high-definition multimedia interface (HDMI), or the like.

Device 300 may perform various operations described herein. Device 300 may perform these operations in response to processor 320 executing software instructions included in a computer-readable medium, such as memory 330. A computer-readable medium is defined as a non-transitory memory device. A memory device includes memory space within a single physical storage device or memory space spread across multiple physical storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided as an example. In practice, device 300 may include additional components, fewer components, different components, or differently arranged components than those shown in FIG. 3. Additionally, or alternatively, one or more components of device 300 may perform one or more functions described as being performed by another one or more components of device 300.

Figure 4:
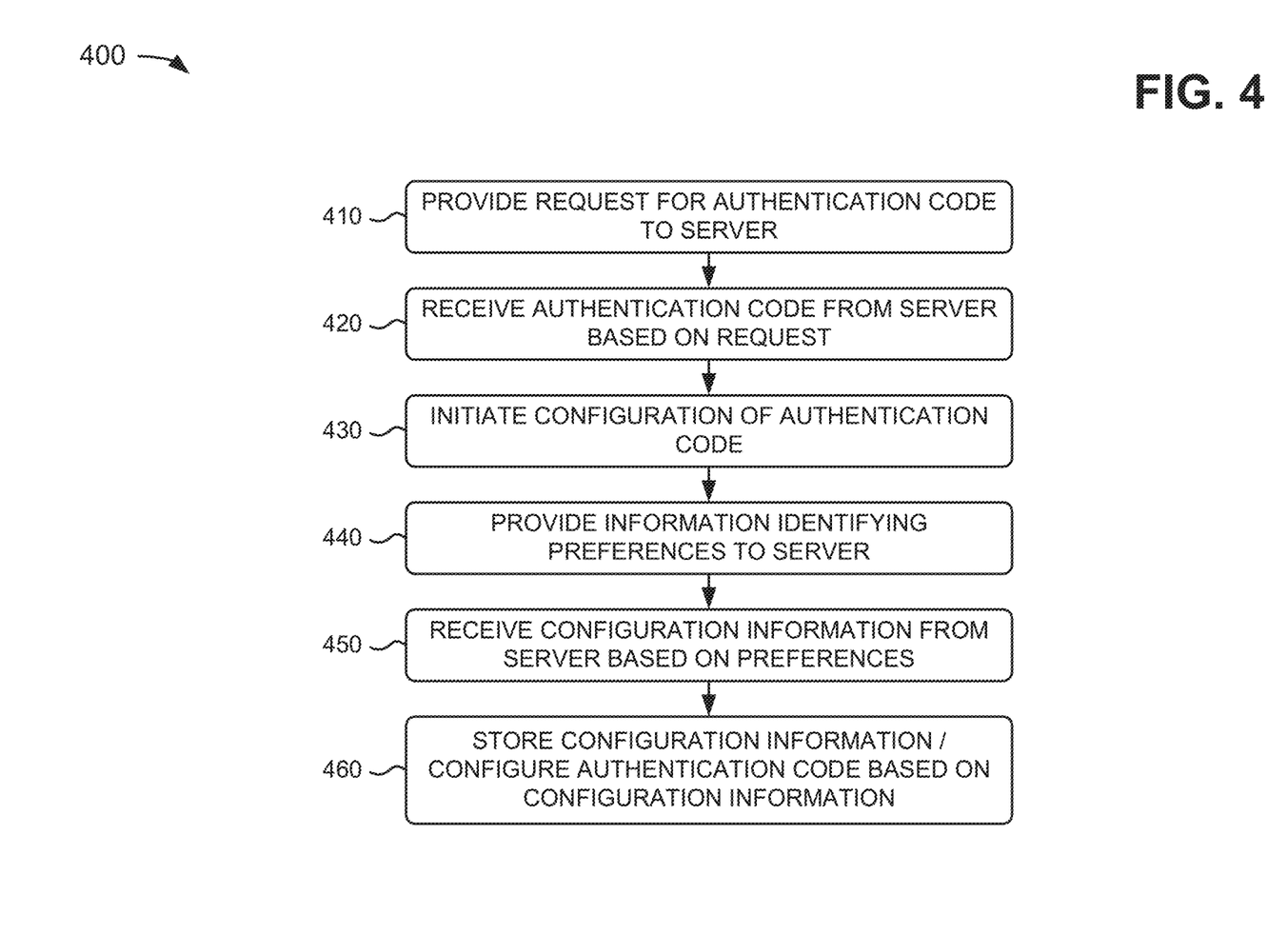
FIG. 4 is a flow chart of an example process for receiving and configuring code that enables authentication of content provider web sites and/or applications via a user device identifier.

FIG. 4 is a flow chart of an example process 400 for receiving and configuring code that enables authentication of content provider web sites and/or applications via a user device identifier. In some implementations, one or more process blocks of FIG. 4 may be performed by content server 220. In some implementations, one or more process blocks of FIG. 4 may be performed by another device or a group of devices separate from or including content server 220.

As shown in FIG. 4, process 400 may include providing a request for authentication code to a server (block 410). For example, a content provider may cause content server 220 to provide a request for authentication code to identity server 230. In some implementations, the authentication code may include an application, a code snippet, a script, a widget, etc. that may cause user device 210 to generate a request to authenticate content prior to or after displaying the content to a user of user device 210. In some implementations, the content provider may cause content server 220 to access the authentication code via, for example, a user interface (such as a browser) or in another manner. The content provider may then select, using content server 220, information regarding the authentication code from the user interface to cause content server 220 to provide a request for the authentication code to identity server 230. In some implementations, identity server 230 may offer the authentication code to content server 220 without content server 220 providing the request for the authentication code.

As further shown in FIG. 4, process 400 may include receiving the authentication code from the server based on the request (block 420). For example, content server 220 may receive the authentication code from identity server 230, and may store the authentication code in a memory associated with content server 220 (e.g., memory 330, FIG. 3). In some implementations, the content provider, of content server 220, may establish an account associated with the authentication code prior to or after receiving the authentication code.

As further shown in FIG. 4, process 400 may include initiating a configuration of the authentication code (block 430). For example, the content provider may initiate the authentication code and identify, using content server 220, one or more preferences relating to causing user device 210 to generate a request to authenticate content prior to or after displaying the content to a user of user device 210. In some implementations, the content provider may identify the one or more preferences using one or more elements of a user interface provided by content server 220. The one or more elements may include, for example, one or more text input elements, one or more drop down menu elements, one or more checkbox elements, one or more radio button elements, and/or any other types of elements that may be used to receive information from the content provider.

In some implementations, the one or more preferences may include a preference of the content provider with respect to when to initiate the authentication code for the user of user device 210, such as, for example, when content is accessed by user device 210 and prior to the content being displayed, when content is accessed by user device 210 and after the content is displayed, when content is scrolled by the user via user device 210, at the end of content, etc.

In some implementations, the one or more preferences may include a preference of the content provider with respect to an identifier of user device 210. In some implementations, the content provider may elect to utilize a portion of the identifier of user device 210 for authentication of content. For example, if the identifier of user device 210 is a particular MDN (e.g., "333-444-8901"), the content provider may elect to utilize a portion (e.g., the last four digits, the first three digits, one or more particular digits, etc.) of the particular MDN and to mask or hide a remaining portion of the particular MDN. In such an example, the content provider may elect to authenticate content based on the portion and the remaining portion of the MDN (e.g., "xxx-xxx-8901"). In some implementations, the content provider may elect to utilize the entire identifier of user device 210 for authentication of content. For example, if the identifier of user device 210 is a particular MDN (e.g., "222-324-7613"), the content provider may elect to utilize the entire particular MDN for authentication of content.

In some implementations, a type of the account, of the content provider, associated with the authentication code may determine the quantity of preferences that the content provider is able to identify. For example, the authentication code may enable the content provider to identify only a portion of the above preferences or identify additional preferences based on the type of the account with which the content provider is associated.

As further shown in FIG. 4, process 400 may include providing information identifying one or more preferences to the server (block 440). For example, the content provider may cause content server 220 to provide, to identity server 230, information identifying the one or more preferences relating to the content provider and provided during the configuration of the authentication code.

As further shown in FIG. 4, process 400 may include receiving configuration information from the server based on the preferences (block 450). For example, content server 220 may receive, from identity server 230, configuration information that may be used to configure the authentication code to cause user device 210 to generate a request to authenticate content prior to or after displaying the content to a user of user device 210.

In some implementations, identity server 230 may generate the configuration information, which may be used to configure the authentication code, based on the information identifying the one or more preferences of the content provider. For example, the configuration information may include information that indicates that the authentication code is to be initiated when content is accessed from content server 220 and prior to being displayed to the user, information that indicates that the authentication code is to be initiated when content is accessed from content server 220 and after being displayed to the user, information that indicates that the authentication code is to be initiated when the content is scrolled by a user of user device 210, and/or information that indicates that authentication code is to be initiated at the end of the content.

In some implementations, the configuration information may include information that causes user device 210 to generate a request to authenticate content prior to or after displaying the content to a user of user device 210. In some implementations, the configuration information may include information that indicates whether content server 220 may utilize a portion of the identifier of user device 210 for authentication of content. In some implementations, the configuration information may include information that indicates whether the content server 220 may utilize the entire identifier of user device 210 for authentication of content.

In some implementations, the configuration information may be obtained from a data structure. In some implementations, identity server 230 may provide, to content server 220, the configuration information independent of receiving the information identifying the one or more preferences of the content provider.

As further shown in FIG. 4, process 400 may include storing the configuration information and configuring the authentication code based on the configuration information (block 460). For example, the content provider may cause content server 220 to store all or a portion of the configuration information received from identity server 230. The authentication code may be configured based on storing all or a portion of the configuration information.

In some implementations, identity server 230 may provide updates, to the configuration information, to content server 220 based on use of the authentication code by the content provider and/or by users of user devices 210. For example, identity server 230 may receive updates, to the configuration information, from one or more other content providers and may provide the received updates to content server 220. Content server 220 may store the updates to the configuration information. In some implementations, identity server 230 may provide the updates periodically based on a preference of the content provider and/or based on a time frequency determined by identity server 230. In some implementations, identity server 230 may determine whether to provide the updates based on the type of the account associated with the content provider.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
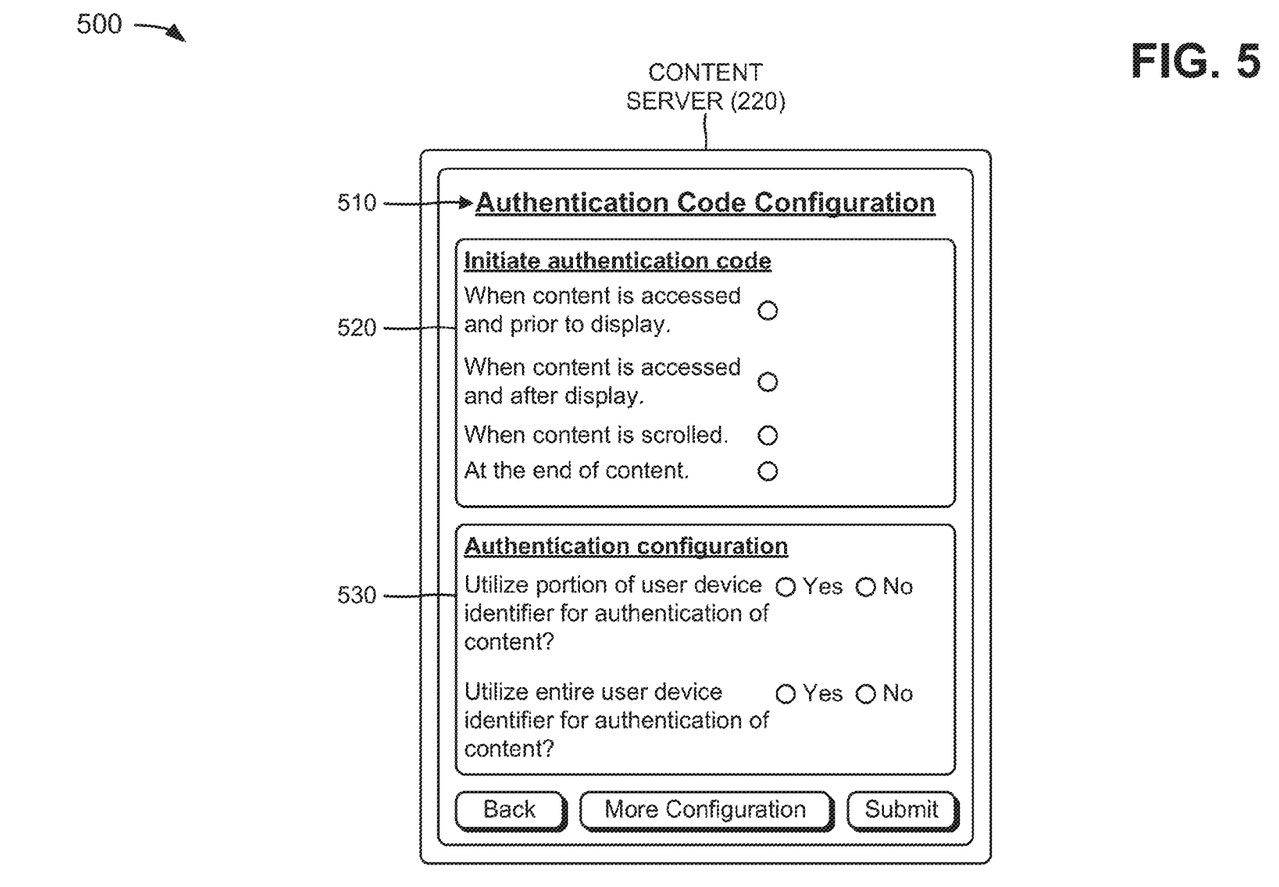
FIG. 5 is a diagram of an example user interface that may be used in connection with the example process shown in FIG. 4.

FIG. 5 is a diagram of an example user interface 500 that may be used in connection with example process 400 shown in FIG. 4. In some implementations, user interface 500 may be provided by content server 220 to a content provider to enable the content provider to identify information (e.g., preferences) that may be used to configure authentication code 510 to cause user device 210 to generate a request to authenticate content prior to or after displaying the content to a user of user device 210.

As shown in FIG. 5, user interface 500 may allow the content provider to configure different features of authentication code 510. For example, the content provider may identify preferences for initiation of authentication code 510 in a configuration section 520. In some implementations, the content provider may indicate that the content provider wants to initiate authentication code 510 when content is accessed from content server 220 by user device 210 and prior to being displayed by user device 210. In some implementations, the content provider may indicate that the content provider wants to initiate authentication code 510 when content is accessed from content server 220 by user device 210 and after being displayed by user device 210. In some implementations, the content provider may indicate that the content provider wants to initiate authentication code 510 when content, provided by content server 220, is scrolled by the user of user device 210. In some implementations, the content provider may indicate that the content provider wants to initiate authentication code 510 at the end of content provided by content server 220 to user device 210.

In some implementations, the content provider may indicate whether the content provider wants to initiate authentication code 510 a particular amount of time after user device 210 accesses the content. For example, if the user does not move away from the content within a particular amount of time (e.g., in seconds, minutes, etc.), then content server 220 may initiate authentication code 510.

As further shown in FIG. 5, the content provider may identify preferences for utilizing information associated with user device 210 in another configuration section 530. In some implementations, the content provider may indicate whether the content provider wants to utilize a portion of the identifier of user device 210 for authentication of content. In some implementations, the content provider may indicate whether the content provider wants to utilize the entire identifier of user device 210 for authentication of content. In some implementations, the content provider may select which digits of the identifier of user device 210 to utilize for authentication of content.

Once the content provider has identified the preferences, user interface 500 may allow the content provider to select a "Submit" option to store the preferences and/or submit the preferences to identity server 230. Identity server 230 may then provide, to content server 220, configuration information based on the preferences.

As further shown in FIG. 5, user interface 500 may also allow the content provider to select a "Back" option to cause content server 220 to provide information regarding authentication code 510. As also shown in FIG. 5, user interface 500 may also allow the content provider to select a "More Configuration" option to enable the content provider to identify additional information that may be used to configure authentication code 510.

The number of elements of user interface 500 shown in FIG. 5 is provided for explanatory purposes. In practice, user interface 500 may include additional elements, fewer elements, different elements, or differently arranged elements than those shown in FIG. 5.

Figure 6:
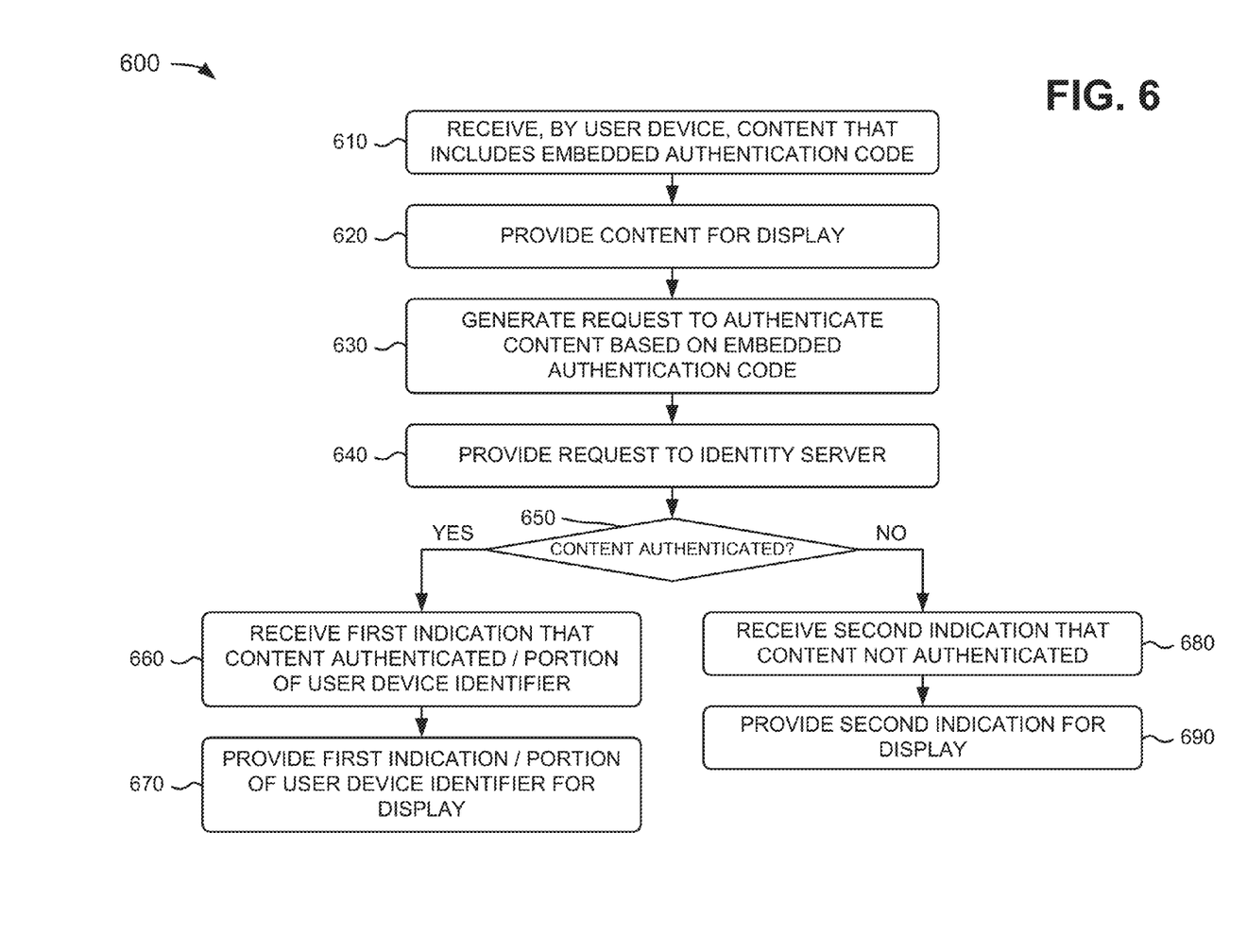
FIG. 6 is a flow chart of an example process for authenticating content provider web sites and/or applications via a user device identifier.

FIG. 6 is a flow chart of an example process 600 for authenticating content provider web sites and/or applications via a user device identifier. In some implementations, one or more process blocks of FIG. 6 may be performed by user device 210. In some implementations, one or more process blocks of FIG. 6 may be performed by another device or a group of devices separate from or including user device 210.

As shown in FIG. 6, process 600 may include receiving, by a user device, content that includes embedded authentication code (block 610). For example, a user may utilize user device 210 to access content provided by content server 220. In some implementations, user device 210 may access a web site, a web page, an application, an email, etc. that includes content provided by content server 220. For example, the user may provide, to user device 210, an address (e.g., a uniform resource locator (URL)) associated with a web page (e.g., for an online transaction) provided by content server 220, and user device 210 may access the content via the web page and based on the address. In some implementations, content server 220 may provide authentication code 510, embedded within the content, to user device 210. In some implementations, content server 220 may not provide authentication code 510 to user device 210, and may execute authentication code 510 at content server 220.

As further shown in FIG. 6, process 600 may include providing the content for display (block 620). For example, user device 210 may display the content to a user associated with user device 210. In some implementations, authentication code 510 may be executed before user device 210 displays the content to the user. In some implementations, authentication code 510 may be executed after user device 210 displays the content to the user. In some implementations, the content may include a web site, a portion of a web site, a web page, a portion of a web page, an email, an advertisement, a link, etc.

As further shown in FIG. 6, process 600 may include generating a request to authenticate the content based on the embedded authentication code (block 630). For example, authentication code 510 may cause user device 210 to generate a request to authenticate the content before or after the content is displayed by user device 210. In some implementations, execution of authentication code 510 may generate instructions that instruct user device 210 to generate the request, and user device 210 may generate the request based on the instructions. In some implementations, the request to authenticate the content may include information identifying the content (e.g., an address of the content, a link associated with the content, etc.); information requesting whether the content is authenticated; information identifying user device 210 (e.g., an identifier (e.g., a MDN, a MEID, etc.) of user device 210); etc. In some implementations, the request may not include the identifier of user device 210, but may include header that identifies user device 210.

As further shown in FIG. 6, process 600 may include providing the request to authenticate the content to an identity server (block 640). For example, authentication code 510 may cause user device 210 to provide the request to authenticate the content to identity server 230 before or after the content is displayed by user device 210. In some implementations, execution of authentication code 510 may generate instructions that instruct user device 210 to provide the request to an address (e.g., an IP address) associated with identity server 230, and user device 210 may provide the request to identity server 230 based on the instructions.

As further shown in FIG. 6, process 600 may include determining whether the content is authenticated (block 650). For example, identity server 230 may determine whether the content is authenticated based on the request to authenticate the content. In some implementations, identity server 230 may include or be associated with a data structure (e.g., within data storage 240) that includes device identifiers (e.g., MDNs, MEIDs, etc.); information associated with content determined to be authenticated by identity server 230 (e.g., content provided by a trusted content provider, addresses of the authenticated content, etc.); and/or other information (e.g., account information associated with users of user devices 210). Identity server 230 may compare the content identified in the request to authenticate the content with the authenticated content information provided in data storage 240 in order to determine whether the content is authenticated. In some implementations, if the content identified in the request matches authenticated content information provided in data storage 240, identity server 230 may determine that the content is authenticated.

In some implementations, identity server 230 may previously review content of various content providers at the request of the content providers or without the request of the content providers. For example, identity server 230 may determine whether the content meets particular standards for encryption of sensitive information; may determine whether the content provider is a real and legitimate business (e.g., that the content provider is a registered business with an appropriate authority); may periodically scan the content for malicious activity (e.g., viruses, malware, etc.); etc. If the content satisfies the aforementioned requirements, identity server 230 may determine that the content is authenticated, and may generate authenticated content information for the content. Identity server 230 may store the authenticated content information in data storage 240.

In some implementations, if the content identified in the request does not match any authenticated content information provided in data storage 240, identity server 230 may determine that the content is not authenticated. In such implementations, identity server 230 may attempt to retrieve sufficient information from the content provider of the content, so that identity server 230 may authenticate the content.

As further shown in FIG. 6, if the content is authenticated (block 650—YES), process 600 may include receiving a first indication that the content is authenticated and a portion of an identifier of the user device (block 660). For example, if identity server 230 determines that the content is authenticated, identity server 230 may generate an indication indicating that the content is authenticated. Identity server 230 may include a portion of the identifier of user device 210 (e.g., or the entire identifier) in the indication since identity server 230 knows the identifier of user device 210 (e.g., as a service provider of the user). Identity server 230 may provide the indication, with the portion of the identifier, to user device 210. User device 210 may receive the indication with the portion of the identifier. In some implementations, the display of the content, by user device 210, may be conditioned upon user device 210 receiving the indication with the portion of the identifier.

As further shown in FIG. 6, if the content is authenticated (block 650—YES), process 600 may include providing the first indication and the portion of the identifier of the user device for display (block 670). For example, user device 210 may provide the indication, indicating that the content is authenticated, and the portion of the identifier of user device 210 for display to the user. In some implementations, user device 210 may display the indication and the portion of the identifier of user device 210 with the content. In some implementations, user device 210 may display the indication and the portion of the identifier of user device 210 via a secured seal, a trust seal, a data security seal, a business verified seal, a privacy seal, etc. Such seals may inspire confidence in a user of the content, and may demonstrate, to the user, that the content provider is concerned with security and business identity, that content and/or services provided by the content provider are available and functioning, etc. In some implementations, the user of user device 210 may select an authentication image to be displayed instead of the portion of the identifier of user device 210. In such implementations, user device 210 may display the indication and the selected authentication image to the user.

As further shown in FIG. 6, if the content is not authenticated (block 650—NO), process 600 may include receiving a second indication that the content is not authenticated (block 680). For example, if identity server 230 determines that the content is not authenticated, identity server 230 may generate another indication indicating that the content is not authenticated. Identity server 230 may provide the other indication to user device 210, and user device 210 may receive the other indication.

As further shown in FIG. 6, if the content is not authenticated (block 650—NO), process 600 may include providing the second indication for display (block 690). For example, user device 210 may provide the other indication, indicating that the content is not authenticated, for display to the user. In some implementations, user device 210 may display the other indication with the content. In some implementations, user device 210 may redirect away from the content and may display the other indication separately from the content. In such implementations, user device 210 may redirect away from the content by accessing previously accessed authenticated content, a home page associated with user device 210, and/or other authenticated content. As a result, a user of user device 210 may avoid accessing unauthenticated content for an extended period of time.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7A:
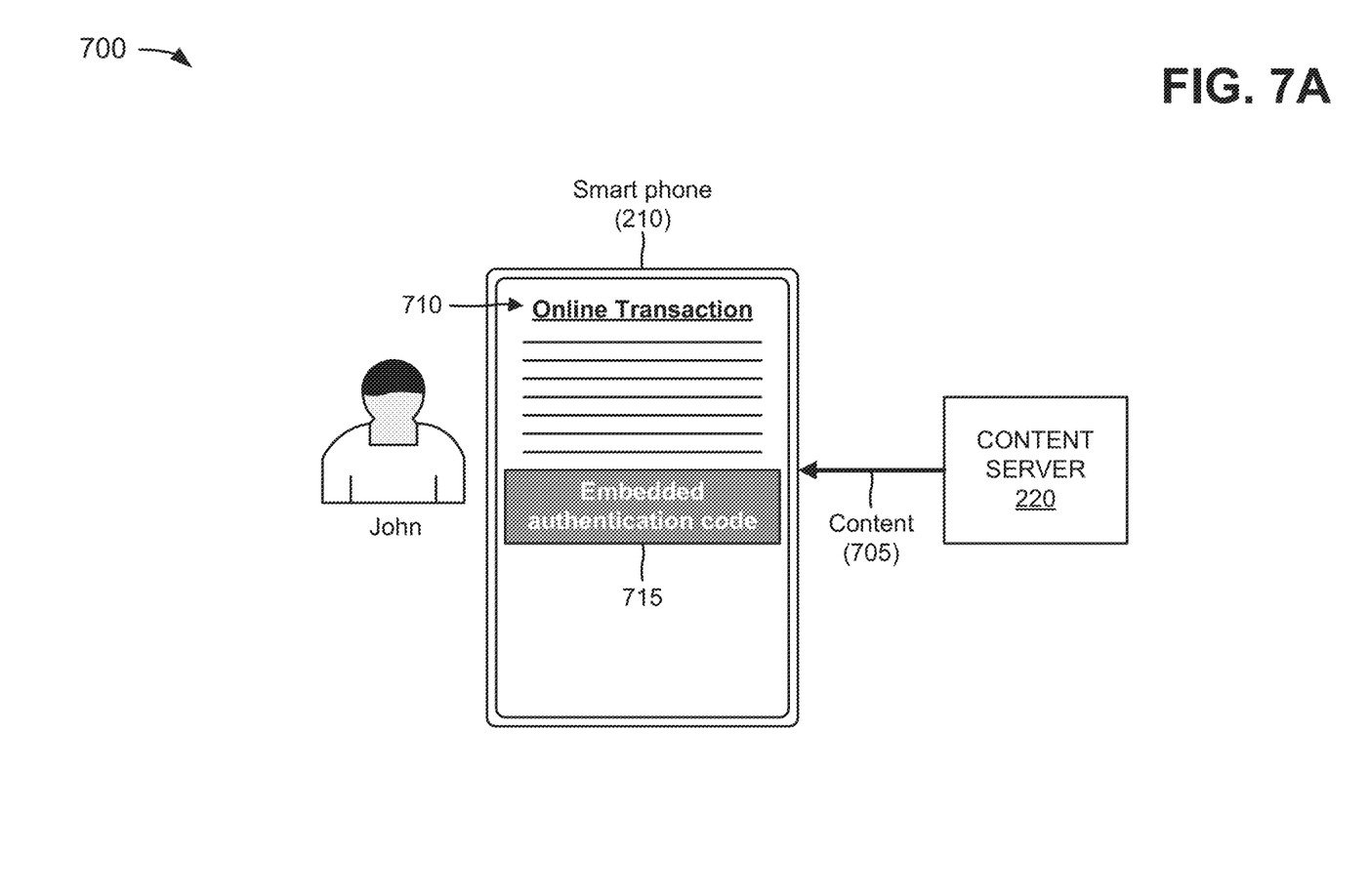
FIGS. 7A-7D are diagrams of an example relating to the example process shown in FIG. 6.

FIGS. 7A-7D are diagrams of an example 700 relating to example process 600 shown in FIG. 6. In example 700, assume that a user (e.g., John) is associated with a user device 210 (e.g., a smart phone 210), as shown in FIG. 7A. Further, assume that John utilizes smart phone 210 to access content 705 provided by content server 220. For example, John may utilize smart phone 210 to perform an online transaction, and may be ready to provide payment information for the transaction. In such an example, content 705 may include a web page that requests John's payment information, and smart phone 210 may display the web page to John, as indicated by reference number 710. As further shown in FIG. 7A, content 705 may include embedded authentication code 715, which includes the features of authentication code 510 described above in connection with FIGS. 5 and 6.

Figure 7B:
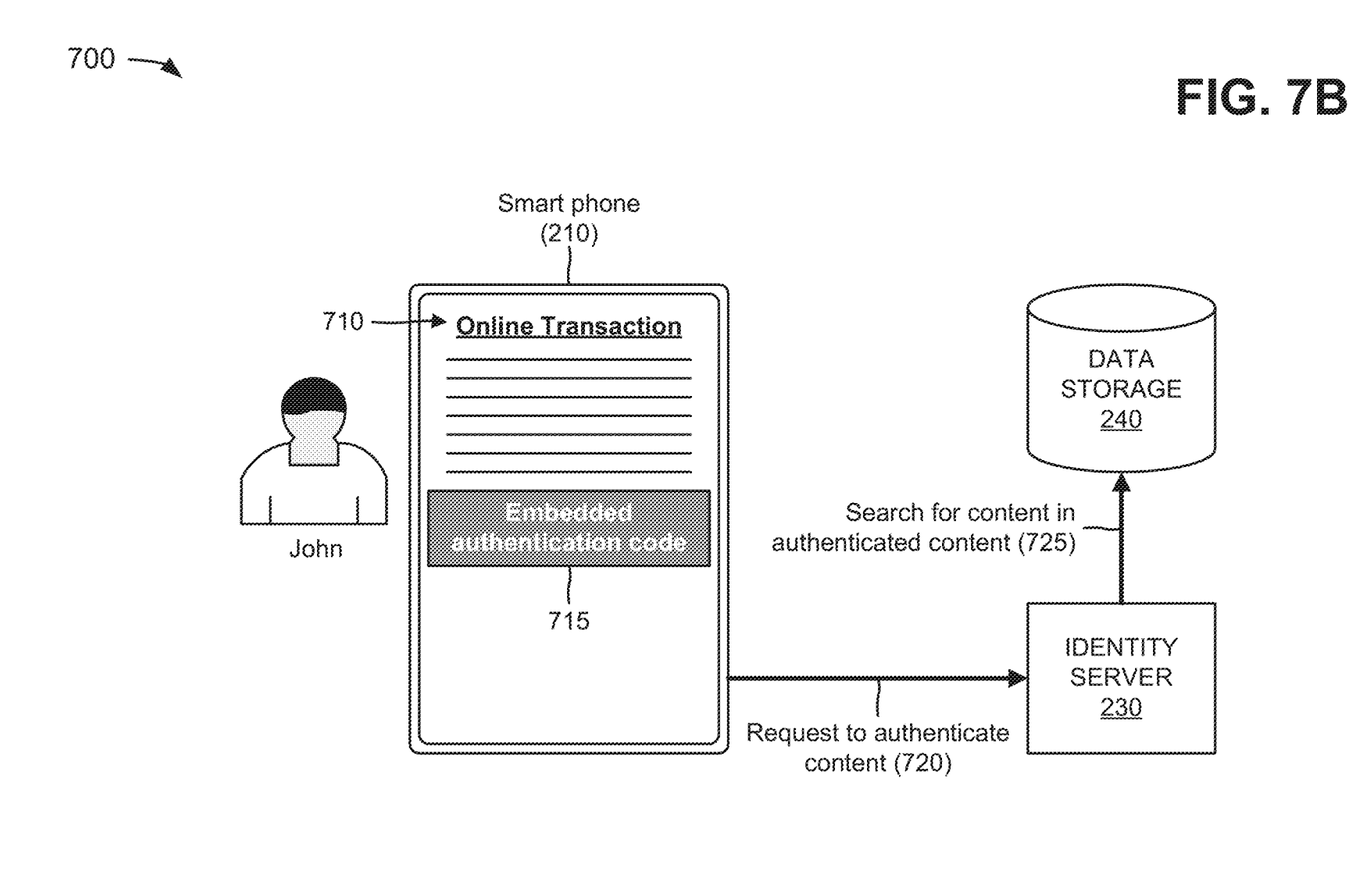

In example 700, assume that embedded authentication code 715 is executed after content 705 is displayed to John. As shown in FIG. 7B, execution of embedded authentication code 715 may cause smart phone 210 to generate a request 720 to authenticate content 705. Execution of embedded authentication code 715 may further cause smart phone 210 provide request 720 to identity server 230. Request 720 may include information identifying content 705 (e.g., an address of content), an identifier of smart phone 210, and information requesting that content 705 be authenticated. Identity server 230 may receive request 720, and may search for content 705, based on request 720, in authenticated content information provided in data storage 240, as indicated by reference number 725 in FIG. 7B.

Figure 7C:
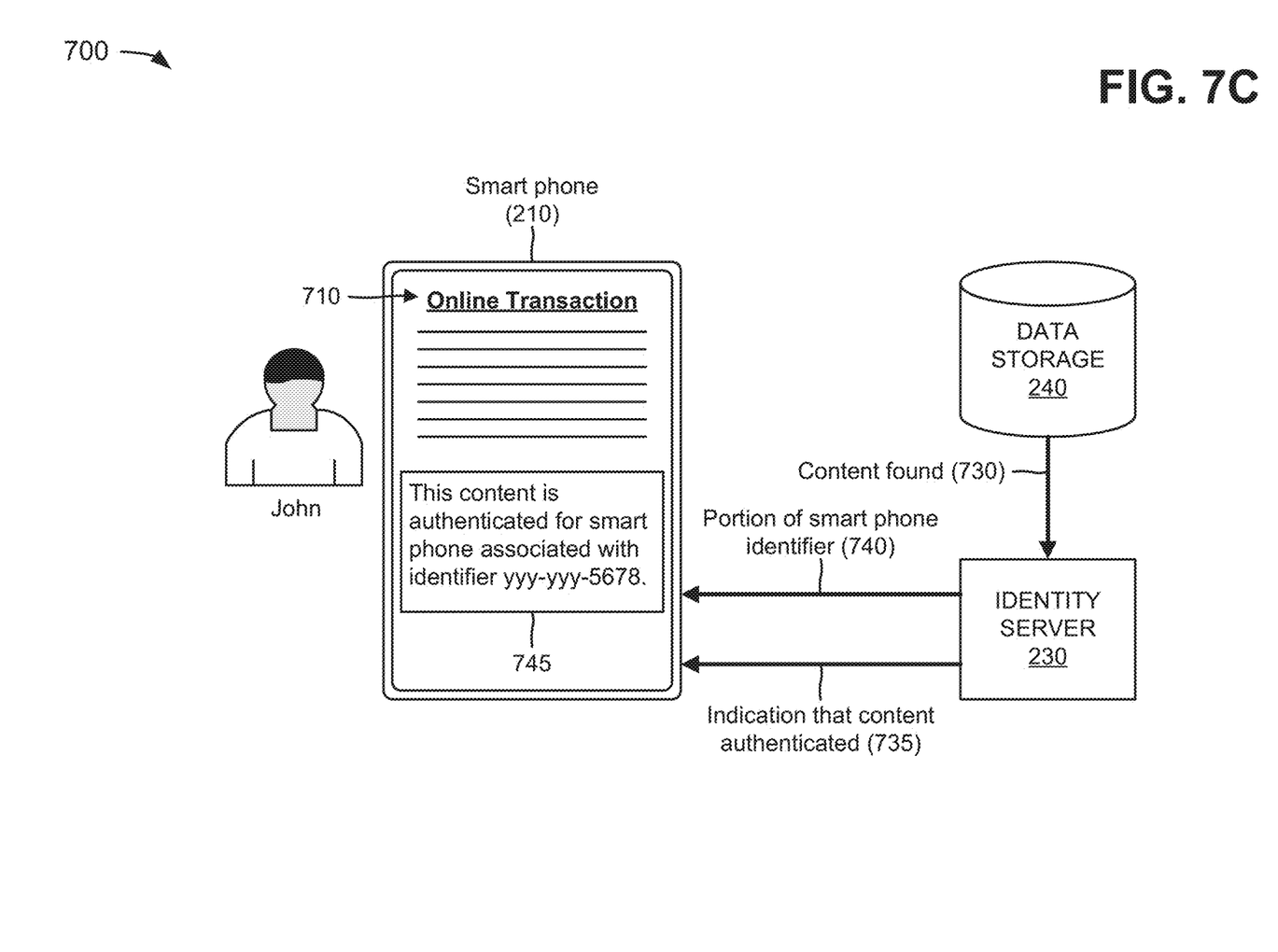

If content 705 is found in the authenticated content information provided in data storage 240, identity server 230 may receive, from data storage 240, information 730 indicating that content 705 is found in the authenticated content information, as shown in FIG. 7C. Based on information 730, identity server 230 may generate an indication 735 indicating that content 705 is authenticated, and may include a portion (e.g., "yyy-yyy-5678") of an identifier 740, associated with smart phone 210, in indication 735. Identity server 230 may provide the indication 735, with the portion of identifier 740, to smart phone 210, and smart phone 210 may display indication 735 and the portion of identifier 740 to John, as indicated by reference number 745 in FIG. 7C. For example, smart phone 210 may display information stating that "This content is authenticated for smart phone associated with identifier yyy-yyy-5678." In some implementations, the display of web page 710, by smart phone 210, may be conditioned upon smart phone 210 receiving indication 735 and the portion of identifier 740.

Figure 7D:
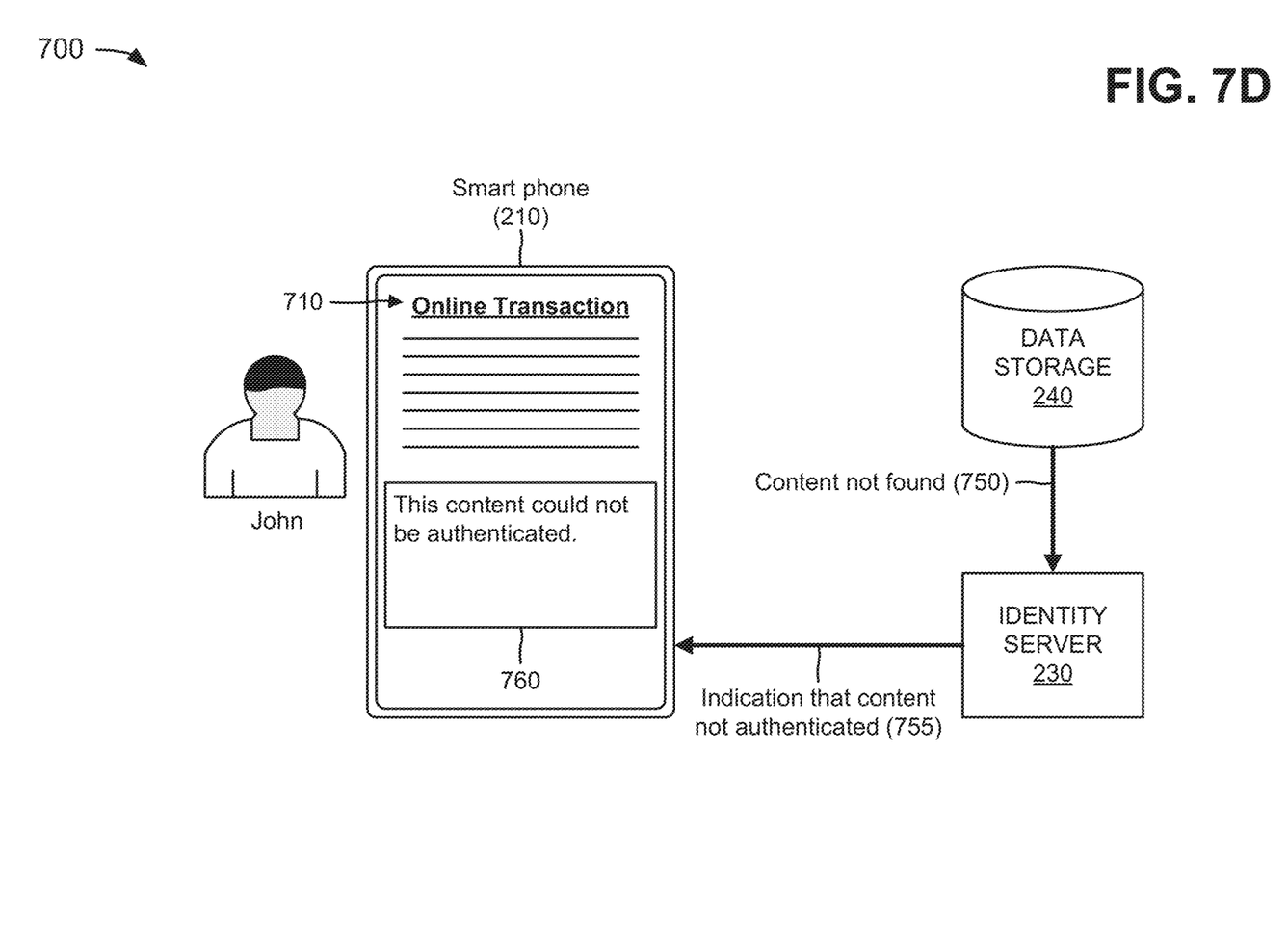

If content 705 is not found in the authenticated content information provided in data storage 240, identity server 230 may receive, from data storage 240, information 750 indicating that content 705 is not found in the authenticated content information, as shown in FIG. 7D. Based on information 750, identity server 230 may generate an indication 755 indicating that content 705 is not authenticated, and may provide indication 755 to smart phone 210. Smart phone 210 may display indication 755 to John, as indicated by reference number 760 in FIG. 7D. For example, smart phone 210 may display information stating that "This content could not be authenticated."

As indicated above, FIGS. 7A-7D are provided merely as an example. Other examples are possible and may differ from what was described with regard to FIGS. 7A-7D. In some implementations, the various operations described in connection with FIGS. 7A-7D may be performed automatically or at the request of the user.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The foregoing disclosure provides illustration and description, but is not intended to be exhaustive or to limit the implementations to the precise form disclosed. Modifications and variations are possible in light of the above disclosure or may be acquired from practice of the implementations.

A component is intended to be broadly construed as hardware, firmware, or a combination of hardware and software.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A method, comprising:
   receiving, by a device, content that includes embedded authentication code;
   providing, by the device, the content including the embedded authentication code for display;
   generating, by the device, a request to authenticate the content based on execution of the embedded authentication code;
   providing, by the device, the request to authenticate the content to a server device,
      the content being authenticated based on the request;
   receiving, by the device and from the server device, a first indication indicating that the content is authenticated, when the content is authenticated,
      the first indication including a portion of an identifier associated with the device;
   providing, by the device, the first indication and the portion of the identifier associated with the device for display when the content is authenticated,
      the first indication including information indicating that the content is authenticated; and
   providing, by the device, a second indication indicating that the content is not authenticated when the content is not authenticated.

2. The method of claim 1,
   where the embedded authentication code, included in the content, is not rendered for display when the content is rendered for display.

3. The method of claim 1, further comprising:
accessing authenticated content based on the second indication; and
providing the second indication for display with the authenticated content.

4. The method of claim 1, where:
the device includes a mobile device, and
the identifier includes a mobile directory number (MDN) or a mobile equipment identifier (MEID) associated with the mobile device.

5. The method of claim 1, further comprising:
executing the embedded authentication code prior to providing the content for display.

6. The method of claim 1, where the portion of the identifier includes one or more digits of a telephone number associated with the device.

7. The method of claim 1, where the first indication includes a seal.

8. A device, comprising:
a memory; and
one or more processors to:
receive content that includes embedded authentication code,
generate a request to authenticate the content based on execution of the embedded authentication code,
provide the request to authenticate the content to a server device based on the execution of the embedded authentication code,
the request including information identifying the content,
the content being authenticated based on comparing the content, identified in the request, with authenticated content information stored in a data storage associated with the server device,
receive, from the server device, a first indication indicating that the content is authenticated, when the content is authenticated,
the first indication including a portion of a unique identifier associated with the device,
provide the content, the first indication, and the portion of the unique identifier associated with the device for display when the content is authenticated,
the first indication including information indicating that the content is authenticated,
receive, from the server device, a second indication indicating that the content is not authenticated, when the content is not authenticated, and
provide the second indication for display when the content is not authenticated.

9. The device of claim 8, where the content is authenticated when the content matches the authentication content information stored in the data storage, and
where the content is not authenticated when the content does not match the authentication content information stored in the data storage.

10. The device of claim 8, where the one or more processors are further to:
access authenticated content based on the second indication, and
provide the second indication for display with the authenticated content.

11. The device of claim 8, where:
the device includes a mobile user device, and
the unique identifier includes a mobile directory number (MDN) or a mobile equipment identifier (MEID) associated with the mobile user device.

12. The device of claim 8, where the one or more processors are further to:
execute the embedded authentication code prior to providing the content for display.

13. The device of claim 8, where the portion of the unique identifier includes one or more digits of a telephone number associated with the device.

14. The device of claim 8, where the first indication includes a seal.

15. A non-transitory computer-readable medium for storing instructions, the instructions comprising:
one or more instructions that, when executed by one or more processors of a device, cause the one or more processors to:
receive content that includes embedded authentication code,
execute the embedded authentication code to:
generate a request to authenticate the content, and
provide the request to authenticate the content to a server device,
the request including information identifying the content,
the content being authenticated based on the server device comparing the content, identified in the request, with information stored in a data storage associated with the server device,
receive, from the server device, an indication indicating that the content is authenticated, when the content is authenticated,
the indication including a portion of a unique identifier associated with the device, and
provide the content, the indication, and the portion of the unique identifier associated with the device for display when the content is authenticated,
the indication including information indicating that the content is authenticated.

16. The non-transitory computer-readable medium of claim 15, where the instructions further comprise:
one or more instructions that, when executed by the one or more processors, cause the one or more processors to:
receive, from the server device, a second indication indicating that the content is not authenticated, when the content is not authenticated, and
provide the second indication for display.

17. The non-transitory computer-readable medium of claim 16, where the instructions further comprise:
one or more instructions that, when executed by the one or more processors, cause the one or more processors to:
access authenticated content based on the second indication, and
provide the second indication for display with the authenticated content.

18. The non-transitory computer-readable medium of claim 15, where:
the device includes a mobile user device, and
the unique identifier includes a mobile directory number (MDN) or a mobile equipment identifier (MEID) associated with the mobile user device.

19. The non-transitory computer-readable medium of claim 15, where the instructions further comprise:
one or more instructions that, when executed by the one or more processors, cause the one or more processors to:
execute the embedded authentication code prior to providing the content for display.

20. The non-transitory computer-readable medium of claim 15, where the portion of the unique identifier includes one or more digits of a telephone number associated with the device.

* * * * *